Patented June 7, 1927.

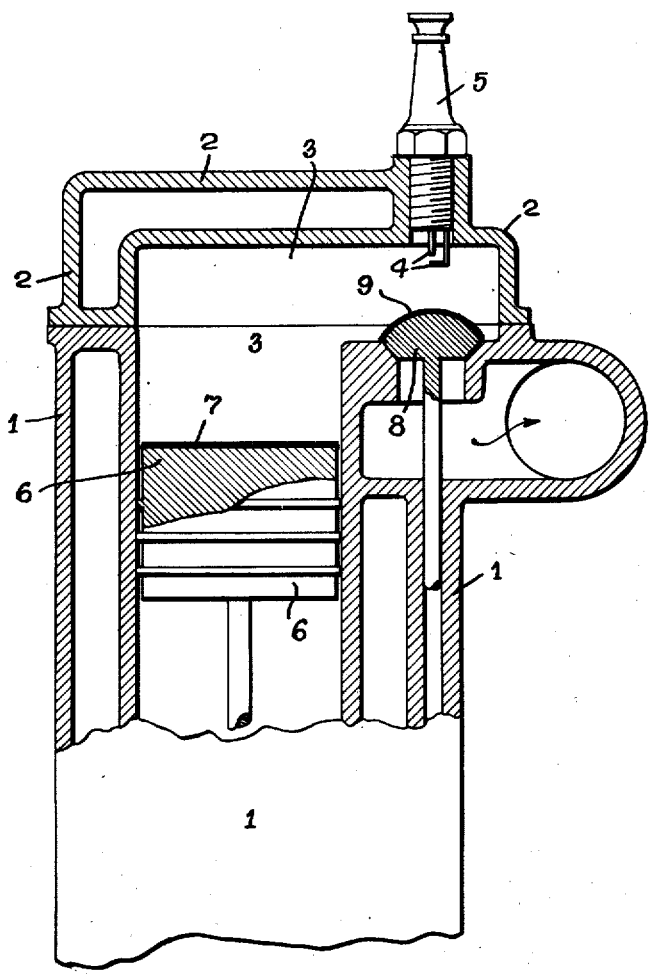

1,631,702

UNITED STATES PATENT OFFICE.

EDWARD SOKAL, OF BROOKLYN, NEW YORK, ASSIGNOR TO AMERICAN KATALITE CORPORATION, OF BROOKLYN NEW YORK, A CORPORATION OF DELAWARE.

INTERNAL-COMBUSTION ENGINE.

Application filed July 9, 1925, Serial No. 42,583, and in Great Britain May 11, 1925.

This invention relates to internal combustion engines, and more particularly to engines of the relatively high compression type.

It is an object of the invention to provide within the combustion chamber of such an engine, substantially stable chemical means possessing the property of counteracting the phenomena and disadvantageous results of detonation, or knocking, which means may be referred to as a detonation counteractant.

Another object of the invention is to provide a beneficial material for location within a combustion chamber which, possessing the property of decreasing the tendency to carbon deposition and heat loss, enhances the efficiency of engine operation.

A further object of the invention is to provide a coating material for the purposes recited, among others, and which may be readily disposed within the interior of a combustion chamber and the effective properties of which will not be permanently affected by the conditions within the combustion chamber.

This application is in part a continuation of my co-pending application for improvements in internal combustion engines filed April 21, 1925, Serial No. 24,882.

At the present time the phenomenon of detonation, or knocking, during the operation of internal combustion engines is of much interest because, other conditions being equal, it is more pronounced with engines of high compression ratios. Accordingly this tendency to detonate with a given fuel becomes practically a limiting factor for improvement in the thermal efficiency and power output through an increase in the compression ratio. This is particularly the case with the "constant volume cycle" type of engine which is used almost exclusively in automobiles and in aeroplanes and also to a considerable extent in small marine and stationary engines.

It is true that there are other limiting factors, such as loss in mechanical efficiency, which may offset the gain in thermal efficiency after a certain increase in the compression ratio, but the limitation due to the injurious effects of detonation becomes operative before these other limiting factors exert their influence. In order to obviate or decrease detonation, it has been suggested that various materials be added to the fuel. Some of these appear to have a favorable action but show the interesting characteristic that if they are added to the fuel in excess of very small quantities, they cause a decrease rather than an increase in power output.

Various tentative explanations have been offered for the phenomenon of detonation. It is my view that detonation, or knocking in internal combustion engines is mainly due to a decomposition or breaking down of the unburned fuel, or in other words, to the dissociation of the larger molecules of the fuel under the influence of heat and pressure into a greater number of smaller molecules whereby there is caused a sudden rise of pressure. This rise of pressure may not be indicative of the true pressure condition within the whole body of the fuel-air mixture, but is rather in the nature of a localized impact. This view is supported by the following considerations: First, the detonating tendency of various fuels is practically a function of their thermal stability, for example, the tendency to detonate decreases in the following order: kerosene, ordinary gasoline, aromatic gasoline, benzol, alcohol and hydrogen, and the thermal stability increases in the same order; second, the indicator diagram of detonating engines shows a very rapid rise of pressure which lasts only a very short period of time, is followed by an equally rapid decline, frequently occurs several times at the beginning of the expansion stroke, the peaks becoming smaller each time, and these rises of pressure are of such short duration that the corresponding pressure volume area is too small to represent an appreciable amount of useful work and hence they manifest themselves as destructive impacts; third, detonation is accompanied by lost power, deposition of carbon and great loss of heat to the water jacket, which loss of power and deposition of carbon may be considered natural results from the decomposition of the fuel, and the loss of heat to the water jacket is probably due to radiation caused by glowing particles of carbon and to the impacts; and, fourth, it has been shown that various factors which cause an increase in the rapidity of combustion and make the combustion more complete have a rather pronounced effect in counteracting detonation. This would seem to follow as an indirect result of the fact that the molecules of the fuel cannot simultaneously undergo a reaction of combustion and of decomposition.

I have discovered that detonation may be counteracted directly and without accelerating combustion by fixedly disposing in the combustion chamber of a standard internal combustion engine a coating material containing a substance, or substances, which has a low melting point, or which passes into another form at a relatively low temperature. Detonation being due to a thermal decomposition of the fuel, then by bringing the fuel-air mixture into contact with a detonation counteractant, the decomposition may be inhibited either by lowering the temperature of the unburned fuel; by catalyzing negatively the reaction of decomposition, or it may be by the prevention of a positive catalytic effect on the reaction of decomposition by the walls of the combustion chamber. It may be that these effects are combined and in the present state of knowledge, it would be very difficult, if not impossible, to separate them quantitatively.

While it is believed that the effect produced is primarily a thermal "skin" effect, resulting from a cooling of the fuel-air mixture by a low melting substance or a substance which acts endothermically without melting, as, for example, the formation of an allotropic substance, it is to be considered that the effect may be enhanced or diminished by other characteristics such as conductivity, catalytic properties, reactivity, with particular reference to capability of reaction with oxygen and other components of the gaseous mixture, etc. It must furthermore be borne in mind that such a thermal molecular skin effect of the coating resulting in a cooling down of the unburned fuel and a counteracting of its decomposition, may also influence the rapidity of combustion, and likewise any negative catalytic effect on the decomposition reaction may be combined with a negative catalytic effect on the combustion. However, such characteristics are probably purely accidental coincidences and are not fundamentally of concern in connection with my invention, in accordance with which detonation may be counteracted by fixedly disposing within the combustion chamber of an internal combustion engine a properly adapted permanent solid substance.

It was expected and confirmed by experiments that an extreme cooling effect on the fuel-air mixture would interfere with the functioning of the engine if not render it entirely inoperative, while the same effect, if utilized to a much smaller degree, would result in counteracting detonation without any functional interference.

In practice the invention comprises the utilization of a coating material within a combustion chamber containing a substance of low melting point, as a low melting metallic substance, such as lead, antimony and tellurium. The substance of low melting point may be applied alone in a finely divided condition, as, for example, by brushing the same on a desired surface within the combustion chamber. When a metal is used, it may be applied to the cylinder head through the use of the "Schoop metal spraying process". By this latter method the coating is caused to enter into the pores of the cylinder head where it is securely held and not subject to substantial reaction with the constituents of the gaseous mixture. Further, the coating material may comprise a low melting or endothermically reactive constituent in admixture with a suitable binder, for example, the coating material may consist of subdivided lead and a silicate binder. The proportions of active substance to binder may be varied according to requirements, and it has been found that a satisfactory result is produced when a mixture containing one-half ounce of subdivided lead to one ounce of a silicate is employed. Application may be accomplished by cleaning the desired surface area, coating such area with the detonation counteractant and baking or setting. This procedure may then be repeated until the desired number of coats has been applied. The active substance in the mixture, even though melted, is firmly retained, does not detach itself, and is so intimately in contact with the binding material, and in some cases chemical combination may actually take place, that its reactivity with the gaseous mixture is reduced to a minimum.

The amount of detonation counteractant to be applied in a particular type of engine may be readily determined by suitable tests indicating the proper surface area to be coated in order to obtain efficient operation.

The detonation counteractant is fixedly disposed within the combustion chamber and its disposition is susceptible of being accomplished in a variety of ways. Its relative location within the combustion chamber may also be chosen as desired. For example, the counteractant may be applied to the top of the piston, or directly to the cylinder wall, if this wall is part of the combustion chamber, or to the cylinder head. In certain instances its exposure to the fuel-air mixture may be regulated when desired.

Utilization of a detonation counteractant on account of its endothermic properties produces a marked cooling effect on the fuel-air mixture, so that decomposition of the unburned part is retarded if not prevented. In other words, it prevents the unburned particles in the flame from reaching a temperature sufficiently high to cause their decomposition before actual ignition. If this effect were to be availed of to its fullest extent, it would also prevent propagation of the flame, and accordingly proper functioning of an engine. An experiment in which a large part of the surface of a cylinder head was covered with an active substance alone in a finely subdivided condition, illustrated the correctness of the foregoing statement in that it rendered the engine inoperative. This experiment speaks rather against an explanation by catalytic action. It is necessary therefore to apply the active substance as a coating material to only a portion of the interior of the combustion chamber or if it is desired to cover a larger area, this active substance is to be attenuated through admixture with a binder which is inert.

From the foregoing, it will be seen that the effectiveness of the detonation counteractant contemplated by the invention may be due to the fact that the material employed possesses the ability of undergoing a heat-absorbing change during those periods of engine operation wherein the temperature within the combustion chamber is the highest and the tendency toward detonation is greatest. Moreover, since the invention is directed to the use of a permanent detonation counteractant, the material used should be such that it is capable of returning to its original condition during intermediate periods of engine operation. Accordingly, the term "endothermically reactive material", as employed in the appended claims, is intended to include all materials capable of undergoing, at least in the exposed layer thereof, at the temperatures and under the conditions existent within the chamber in the internal combustion engine in which it is employed, any reversible change of such nature that heat will be absorbed and the required cooling effect exerted at the higher range of the temperatures within the chamber, and that the material will tend to return to its original condition (with a consequent release of heat) at the lower range of temperatures within the chamber. Furthermore, the term "low-melting substance", as used in the claims is intended to refer to a material whose melting point is such that it is capable of undergoing a reversible change in state between the higher and lower ranges of temperatures, and under the conditions, in the chamber in which it is used.

Accordingly the term "low melting substance capable of undergoing a reversible change in state under engine operating conditions" is intended to exclude materials of extremely low melting point such as tin and bismuth as well as materials having a relatively high melting point, such as iron and nickel.

I have shown by a series of experiments made under actual road conditions with a special high compression Ford cylinder head which was used on the one hand without application of a detonation counteractant and on the other, with the application of a detonation counteractant that under heavy load conditions, as for example, hill climbing, the uncoated head detonated at practically all spark and throttle positions, while with the cylinder head coated, the engine operated without detonation with a wide open throttle and a fairly advanced spark. These tests were repeated and varied many times and the results were concordant and satisfactory, evidencing an increase in power output and a counteracting of the conditions to which detonation is due, from which it follows that the thermal efficiency may be increased by an increase in the compression ratio without the attendant disadvantages of detonation.

The drawing is a partly sectional view exemplifying a form of the invention wherein a permanent detonation counteractant, such as contemplated by the invention, is fixedly disposed within the combustion chamber of an internal combustion engine in the form of a coating applied to the exposed surfaces of the piston head and the exhaust valve, the hottest points on the walls of the chamber.

In this exemplification, a cylinder block 1, together with a high compression cylinder head 2 provides a combustion chamber 3 into which the contacts 4 of a spark plug 5 extend. A portion of the wall of the combustion chamber is provided by the piston head 6 on the surface of which is a coating 7 containing a permanent detonation counteractant, such as lead. Another portion of the wall of this chamber is provided by the surface of an exhaust valve 8 on which there may also be provided a coating 9, which may also contain lead, for example.

The detonation counteractant preferably comprises a substance or substances which are nonabrasive, and accordingly no injury to the cylinder walls will result in the event that a portion should become detached.

Among the advantages arising through the utilization of the detonation counteractant, mention may be made of the following: lack of detonation or knocking, lower fuel consumption, more flexible operation of the engine, decrease in carbon deposition and an increase in the thermal efficiency, particularly in connection with the use of high compression engines.

It is to be understood that the invention in its broad sense is for the employment in the combustion chamber of an internal combustion engine of a material possessing the property of counteracting detonation, which material may be used alone or in admixture with a suitable binder, and to permit the redesigning of engines having higher compression ratios.

It is also to be understood that the invention includes the use of that general class of substances which are capable of beneficially undergoing a heat-absorbing change under the conditions of engine operation, and that it is not intended to include any material possessing alone or also another quality which would act to offset the advantage of reducing detonation as contemplated by this invention.

While the theory herein presented offers a basis for an understanding of the manner in which the detonation counteractant may function, and while it is supported by known facts, it is to be understood, of course, that the operativeness and practicability of the invention is not dependent upon or limited in any way by the correctness of such theory.

Since certain changes may be made in the detonation counteractant above described and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an internal combustion engine, the combination with a combustion chamber, of a relatively permanent detonation counteractant fixedly disposed therein, said detonation counteractant comprising a material which acts endothermically to absorb heat during those periods of engine operation when the temperature within the chamber is the greatest, and which is capable of releasing heat during intermediate periods of engine operation.

2. In an internal combustion engine, the combination with a combustion chamber of a material, fixedly disposed within said chamber, which is endothermically reactive under engine operating conditions.

3. In an internal combustion engine, the combination of a combustion chamber, a per- with intake and exhaust valves and ignition means, and a permanent detonation counteractant fixedly disposed within said combustion chamber, said detonation counteractant comprising a low melting substance, capable of undergoing a reversible change in state under engine operating conditions.

4. In an internal combustion engine, the combination of a combustion chamber, a permanent detonation counteractant fixedly disposed within said combustion chamber, said detonation counteractant including a low melting substance capable of undergoing a reversible change in state under engine operating conditions, and a binder.

5. In an internal combustion engine, the combination of a combustion chamber, a permanent detonation counteractant fixedly disposed within said combustion chamber, said detonation counteractant comprising a low melting substance capable of undergoing a reversible change in state under engine operating conditions, and a silicate.

6. In an internal combustion engine, the combination of a combustion chamber, and a permanent detonation counteractant fixedly disposed within said combustion chamber, said detonation counteractant comprising a low melting metallic substance capable of undergoing a reversible change in state under engine operating conditions.

7. In an internal combustion engine, the combination of a combustion chamber, a permanent detonation counteractant fixedly disposed within said combustion chamber, said detonation counteractant comprising lead, and a binder.

8. In an internal combustion engine, the combinaton of a combuston chamber, a permanent detonation counteractant fixedly disposed within said combustion chamber, said detonation counteractant comprising lead in a finely divided condition, and a silicate binder.

9. As an article of manufacture, a coating material for use within the combustion chamber of an internal combustion engine, comprising a low melting substance capable of undergoing a reversible change in state under engine operating conditions and of counteracting detonation and a silicate binder.

10. As an article of manufacture, a coating material for use within the combustion chamber of an internal combustion engine, comprising a low melting metallic substance capable of undergoing a reversible change in state under engine operating conditions and of counteracting detonation and a binder.

11. As an article of manufacture, a coating material for use within the combustion chamber of an internal combustion engine, comprising finely subdivided lead and a silicate.

12. As an article of manufacture, a coating material for use in a combustion chamber of an internal combustion engine comprising a material which is endothermically reactive under engine operating conditions admixed with a binder.

13. A method of effecting improvement in the operation of internal combustion engines, which comprises permanently exposing within the combustion chamber thereof a material which is endothermically reactive under engine operating conditions.

14. A method of effecting improvement in the operation of internal combustion engines, which comprises permanently exposing within the combustion chamber thereof a low melting substance capable of undergoing a reversible change in state under engine operating conditions.

15. A method of effecting improvement in the operation of internal combustion engines, which comprises counteracting detonation of the successive fuel charges in the combustion chamber of an engine by permanently exposing to such charges a solid material which is endothermically reactive under engine operating conditions.

16. In an internal combustion engine, the combination of a combustion chamber having a compression ratio which under normal conditions of operation would result in detonation, or knocking, and a permanent detonation counteractant fixed disposed in said combustion chamber, said detonation counteractant comprising a material which is endothermically reactive under engine operating conditions.

17. In an internal combustion engine, the combination with a combustion chamber of a material fixedly disposed therein and capable of undergoing a reversible physical heat absorbing change under the temperature conditions present in the engine during operation.

18. In an internal combustion engine, the combination with a combustion chamber of a material which is endothermically reactive under engine operating conditions fixedly disposed on certain of those portions of the walls of the chamber which are hottest during operation.

19. In an internal combustion engine, a combustion chamber arranged for the reception of a gaseous mixture and fitted with a piston presenting an exposed surface to the gases in said chamber, said surface comprising a coating containing a low melting substance capable of undergoing a reversible change in state under engine operating conditions.

20. In an internal combustion engine, the combination with a combustion chamber of a coating permanently affixed to certain of the walls of said chamber, said coating containing metallic lead.

In testimony whereof I affix my signature.

EDWARD SOKAL.

14. A method of effecting improvement in the operation of internal combustion engines, which comprises permanently exposing within the combustion chamber thereof a low melting substance capable of undergoing a reversible change in state under engine operating conditions.

15. A method of effecting improvement in the operation of internal combustion engines, which comprises counteracting detonation of the successive fuel charges in the combustion chamber of an engine by permanently exposing to such charges a solid material which is endothermically reactive under engine operating conditions.

16. In an internal combustion engine, the combination of a combustion chamber having a compression ratio which under normal conditions of operation would result in detonation, or knocking, and a permanent detonation counteractant fixed disposed in said combustion chamber, said detonation counteractant comprising a material which is endothermically reactive under engine operating conditions.

17. In an internal combustion engine, the combination with a combustion chamber of a material fixedly disposed therein and capable of undergoing a reversible physical heat absorbing change under the temperature conditions present in the engine during operation.

18. In an internal combustion engine, the combination with a combustion chamber of a material which is endothermically reactive under engine operating conditions fixedly disposed on certain of those portions of the walls of the chamber which are hottest during operation.

19. In an internal combustion engine, a combustion chamber arranged for the reception of a gaseous mixture and fitted with a piston presenting an exposed surface to the gases in said chamber, said surface comprising a coating containing a low melting substance capable of undergoing a reversible change in state under engine operating conditions.

20. In an internal combustion engine, the combination with a combustion chamber of a coating permanently affixed to certain of the walls of said chamber, said coating containing metallic lead.

In testimony whereof I affix my signature.

EDWARD SOKAL.

Certificate of Correction.

Patent No. 1,631,702. Granted June 7, 1927, to

EDWARD SOKAL.

It is hereby certified that error appears in the printed specification of the above-numbered patent requiring correction as follows: Page 4, line 53, claim 3, strike out the words " a per " and insert instead the word *fitted;* page 5, line 21, claim 16, for the word " fixed " read *fixedly;* and that the said Letters Patent should be read with these corrections therein that the same may conform to the record of the case in the Patent Office.

Signed and sealed this 19th day of July, A. D. 1927.

[SEAL.]

M. J. MOORE,
*Acting Commissioner of Patents.*

Certificate of Correction.

Patent No. 1,631,702.                                                     Granted June 7, 1927, to

EDWARD SOKAL.

It is hereby certified that error appears in the printed specification of the above-numbered patent requiring correction as follows: Page 4, line 53, claim 3, strike out the words " a per " and insert instead the word *fitted;* page 5, line 21, claim 16, for the word " fixed " read *fixedly;* and that the said Letters Patent should be read with these corrections therein that the same may conform to the record of the case in the Patent Office.

Signed and sealed this 19th day of July, A. D. 1927.

[SEAL.]                                                                         M. J. MOORE,
*Acting Commissioner of Patents.*